US007654418B2

(12) United States Patent
Law et al.

(10) Patent No.: US 7,654,418 B2
(45) Date of Patent: Feb. 2, 2010

(54) AIRLESS DISPENSING PUMP

(75) Inventors: Brian R. Law, Leicester (GB); Jeffrey William Spencer, Leicester (GB); Robert D. Rohr, LaOtto, IN (US); David J. Pritchett, Fort Wayne, IN (US)

(73) Assignee: Rieke Corporation, Auburn, IN (US)

(*) Notice: Subject to any disclaimer, the term of this patent is extended or adjusted under 35 U.S.C. 154(b) by 527 days.

(21) Appl. No.: 10/930,010

(22) Filed: Aug. 30, 2004

(65) Prior Publication Data

US 2006/0043118 A1 Mar. 2, 2006

(51) Int. Cl.
*G01F 11/00* (2006.01)

(52) U.S. Cl. .................... 222/259; 222/256; 222/321.9; 222/387

(58) Field of Classification Search ............. 222/321.9, 222/257, 259, 494, 321.7, 256, 383.1, 387, 222/383.3
See application file for complete search history.

(56) References Cited

U.S. PATENT DOCUMENTS 3,403,823 A 10/1968 O'Donnell
4,039,139 A 8/1977 Bird
4,139,311 A 2/1979 Lorscheidt
4,154,371 A 5/1979 Kolaczinski et al.
4,323,175 A 4/1982 Eckert
4,394,939 A 7/1983 Thor et al.
4,402,431 A * 9/1983 Wiegner et al. ............. 222/207
4,438,871 A 3/1984 Eckert
4,479,589 A 10/1984 Ford
4,485,943 A 12/1984 Czech et al.
4,558,821 A 12/1985 Tada et al.
4,564,130 A 1/1986 Eulenburg
4,579,147 A 4/1986 Davies et al.
4,589,574 A 5/1986 Foster
4,781,483 A 11/1988 Lorscheidt (Continued)

FOREIGN PATENT DOCUMENTS

CN 2483350 Y 3/2002

(Continued)

OTHER PUBLICATIONS

Machine Translation of WO 92/22467 A1 to Herrmann.

(Continued)

*Primary Examiner*—Frederick C. Nicolas
(74) *Attorney, Agent, or Firm*—Woodard, Emhardt, Moriarty, McNett & Henry LLP

(57) ABSTRACT

An airless dispenser pump assembly includes a pump mechanism with an inlet valve that is configured to efficiently pump viscous fluids and that is able to be pre-primed when the pump mechanism is attached to a container. In one form, the inlet valve includes a seal member that seals an inlet port of the pump and an outer support member that secures the inlet valve to the rest of the pump mechanism. Two or more legs generally extend in a circumferential direction between the support member and the seal member in order to create a large flow opening for fluid flow through the inlet valve when opened and to rapidly close the inlet valve. The pump mechanism further includes an outlet valve that is configured to draw fluid back from a nozzle of the pump after dispensing in order to minimize build up around the nozzle.

31 Claims, 8 Drawing Sheets

U.S. PATENT DOCUMENTS

| | | | | |
|---|---|---|---|---|
| 4,889,262 | A | 12/1989 | Toms | |
| RE33,247 | E | 7/1990 | Bossina | |
| 4,945,941 | A | 8/1990 | Kocher | |
| 4,991,746 | A | 2/1991 | Schultz | |
| 5,096,094 | A | 3/1992 | Guilbert | |
| 5,209,044 | A * | 5/1993 | D'Addario et al. | 53/469 |
| 5,310,112 | A | 5/1994 | Meshberg | |
| 5,356,043 | A | 10/1994 | Glynn | |
| 5,397,035 | A | 3/1995 | Law | |
| 5,445,299 | A | 8/1995 | Harriman | |
| 5,497,915 | A | 3/1996 | Wass | |
| 5,615,806 | A | 4/1997 | Grothoff | |
| 5,655,685 | A | 8/1997 | Carr et al. | |
| 5,664,703 | A | 9/1997 | Reifenberger et al. | |
| 5,673,821 | A | 10/1997 | Davis et al. | |
| 5,816,453 | A | 10/1998 | Spencer et al. | |
| 5,823,394 | A | 10/1998 | Davis et al. | |
| 5,842,605 | A * | 12/1998 | Lehmkuhl | 222/95 |
| 5,884,820 | A | 3/1999 | Thanisch et al. | |
| 5,924,604 | A | 7/1999 | Shimada et al. | |
| 5,941,422 | A | 8/1999 | Struble | |
| 5,975,370 | A | 11/1999 | Durliat | |
| 5,992,442 | A | 11/1999 | Urquhart et al. | |
| 6,213,633 | B1 | 4/2001 | Kramer et al. | |
| 6,240,979 | B1 | 6/2001 | Lorscheidt | |
| 6,257,440 | B1 | 7/2001 | Perkins et al. | |
| 6,269,981 | B1 | 8/2001 | Nielsen | |
| 6,309,124 | B1 | 10/2001 | Gueret | |
| 6,321,908 | B1 | 11/2001 | Lorscheidt | |
| 6,371,333 | B2 | 4/2002 | Lorscheidt et al. | |
| 6,533,145 | B2 | 3/2003 | Lewis et al. | |
| 6,729,501 | B2 * | 5/2004 | Peterson | 222/494 |
| 6,752,153 | B1 | 6/2004 | Eckert | |
| 6,772,916 | B1 | 8/2004 | Reynolds | |
| 6,890,162 | B2 * | 5/2005 | Ding | 222/321.9 |
| 7,059,501 | B2 * | 6/2006 | Masuda | 222/494 |
| 7,111,761 | B2 * | 9/2006 | Masuda | 222/321.7 |
| 2001/0019068 | A1 | 9/2001 | Bloom | |
| 2001/0025863 | A1 | 10/2001 | Lorscheidt | |
| 2003/1075567 | | 4/2003 | Santagiuliana | |
| 2003/0089738 | A1 | 5/2003 | Peterson | |
| 2003/0168475 | A1 | 9/2003 | Heukamp | |
| 2003/0168477 | A1 | 9/2003 | Heukamp | |
| 2003/0231923 | A1 | 12/2003 | Heukamp | |
| 2004/0007601 | A1 * | 1/2004 | Masuda | 222/494 |
| 2004/0206781 | A1 | 10/2004 | Lorscheidt | |
| 2004/0206783 | A1 | 10/2004 | Danne et al. | |

FOREIGN PATENT DOCUMENTS

| | | | |
|---|---|---|---|
| CN | 2493753 | Y | 5/2002 |
| CN | 1378883 | A | 11/2002 |
| CN | 2521166 | Y | 11/2002 |
| EP | 1 384 517 | A | 1/2004 |
| GB | 2 103 298 | A | 2/1983 |
| WO | WO 9222467 | A1 * | 12/1992 |
| WO | WO 99/39982 | | 8/1999 |
| WO | 2002/043872 | A2 | 6/2002 |
| WO | WO03/028898 | A1 | 4/2003 |
| WO | WO 03/028898 | A1 | 4/2003 |
| WO | 2005/021395 | A1 | 3/2005 |

OTHER PUBLICATIONS

EP Search Report dated Feb. 5, 2008 issued in EP Application No. 06253488.8.

First Office Action dated Jan. 4, 2008 in Chinese Patent Application No. 200510087501.9, application filed Jul. 20, 2005.

European Patent Application 06 25 3488 Search Report mailed Apr. 7, 2008.

European Patent Application No. 05 25 4105 Search Report mailed Nov. 24, 2008.

* cited by examiner

AIRLESS DISPENSING PUMP

BACKGROUND

The present invention generally relates to airless dispensing pumps, and more specifically, but not exclusively, concerns an airless dispensing pump that is able to be easily primed in order to efficiently pump viscous fluids while at the same time minimizes contact with sources of contamination, such as air and metals.

Airless type pumps have been developed for a wide range applications including dispensing personal care products, such as skin creams, skin lotions, toothpaste and hair gels, as well as food sauces, and the like. Many such products deteriorate rapidly when placed in contact with air and so it is important to prevent air from entering the package when dispensing the product. In typical dispensing pump applications, air is allowed to enter the container via a venting path in order to equalize the pressure inside the pack as product is dispensed. Were this not the case, the container would progressively collapse or, in the case of rigid containers, the increasing vacuum in the container would exceed the ability of the dispensing pump to draw product out of the container.

With conventional dispensing pumps having a suction pipe or tube, the ability to evacuate the entire contents of the container is relatively poor for viscous products. Usually, the viscous product, such as a cream, is drawn up the suction pipe, which initially works well, but the viscous product does not self-level. As a result, a cavity or hole is formed in the surface of the product to a point where the dispensing pump dispenses only air because it is unable to dispense the product that remains adhered to the sidewalls of the container. As a result, it is common for only about 50% to 60% of the total pack contents of the viscous product to be dispensed with conventional dispensing pumps.

In airless type dispensing systems, there are two common ways to overcome the above-mentioned problems, either by using a collapsible bag type design or by using a follower piston type design. With the collapsible type design, a collapsing bag is attached to the dispensing pump, which progressively collapses as the contents are removed. In the follower piston type design, a rigid container, usually cylindrical or oval in form, has a follower piston that progressively reduces the container volume as product is drawn out by the dispensing pump.

In either type of airless dispensing system, initial priming of the pump mechanism can be somewhat difficult due to the viscous nature of the contents. Even when properly primed, the pump mechanism may not dispense a sufficient amount of fluid due to constrictions within the pumping mechanism, especially the valves. With viscous products, the valves within the pump mechanism need to provide relatively large flow openings, but at the same time, close rapidly to ensure that the product is efficiently pumped. Due to differences in viscosities of various products, it is difficult to easily and inexpensively reconfigure the pumping mechanism to accommodate products with different properties. It is also desirable for a number of products, such as pharmaceuticals, to not come in contact with metal, which can tend to contaminate the pharmaceutical product, and therefore, there is a need to minimize or even eliminate metallic component contact within the pumping mechanism. In typical airless pump designs, after dispensing, product may remain at the outlet of the dispensing head where the product may dry or harden due to contact with air. The dried product usually creates an unsightly appearance, and sometimes can lead to clogging of the outlet. Thus, there is a need for improvement in this field.

SUMMARY

One aspect of the present invention concerns an airless dispenser pump assembly. The assembly includes a pump mechanism that defines a pump cavity with an inlet port through which viscous fluid from a container is supplied. The pump mechanism includes a piston slidably received in the pump cavity to pump the fluid from the pump cavity. An outlet valve member is configured to permit flow of the viscous fluid out of the pump cavity during a dispensing stroke of the piston and to form a vacuum in the pump cavity during an intake stroke of the piston. An inlet valve member covers the inlet port, and the inlet valve member includes an outer support member and an inner seal member that is sized to seal the inlet port during the dispensing stroke of the piston. Two or more connection legs connect the outer support member to the inner seal member for rapidly closing the inlet port during the dispensing stroke of the piston. At least one of the connection legs includes a circumferential portion that extends in a circumferential direction around the seal member to provide a large flow aperture for the viscous fluid between the legs during the intake stroke of the piston.

Another aspect concerns a dispenser pump valve that includes a valve opening and a valve member. The valve member includes an outer support member disposed around the valve opening and an inner seal member that is sized to seal the valve opening. Two or more connection legs connect the outer support member to the inner seal member. At least one of the connection legs includes a portion that extends in a peripheral manner around the inner seal member.

A further aspect concerns a dispenser pump assembly that includes a pump mechanism that defines a pump cavity. The pump mechanism includes an inlet valve member for controlling flow of fluid into the pump cavity and a piston slidably received in the pump cavity to pump the fluid from the pump cavity. The piston defines a flow passage through which the fluid from the pump cavity is pumped. A pump head has a dispensing outlet fluidly coupled to the flow passage for dispensing the fluid. An outlet valve member is received in the flow passage of the piston for controlling flow of the fluid out of the pump cavity. The flow passage includes a first portion sized to create a piston like fit between the first portion and the outlet valve member for drawing the fluid back from the dispensing outlet after the fluid is dispensed. The second portion is sized larger than the first portion to allow the fluid to flow around the outlet valve member during dispensing of the fluid.

Still yet another aspect concerns a technique for pre-priming a pump. The pump includes an inlet valve member that seals an inlet port of the pump. The inlet valve member includes an outer support member, an inner seal member that seals the inlet port and at least two connection legs that connect the outer support member to the inner seal member. A container is filled with fluid through a top opening of the container. The pump is primed by securing the pump to the top opening of the container so that pressure of the fluid inside the container opens the inlet valve member to at least partially fill the pump cavity with the fluid.

Further forms, objects, features, aspects, benefits, advantages, and embodiments of the present invention will become apparent from a detailed description and drawings provided herewith.

DESCRIPTION OF SELECTED EMBODIMENTS

Figure 1:
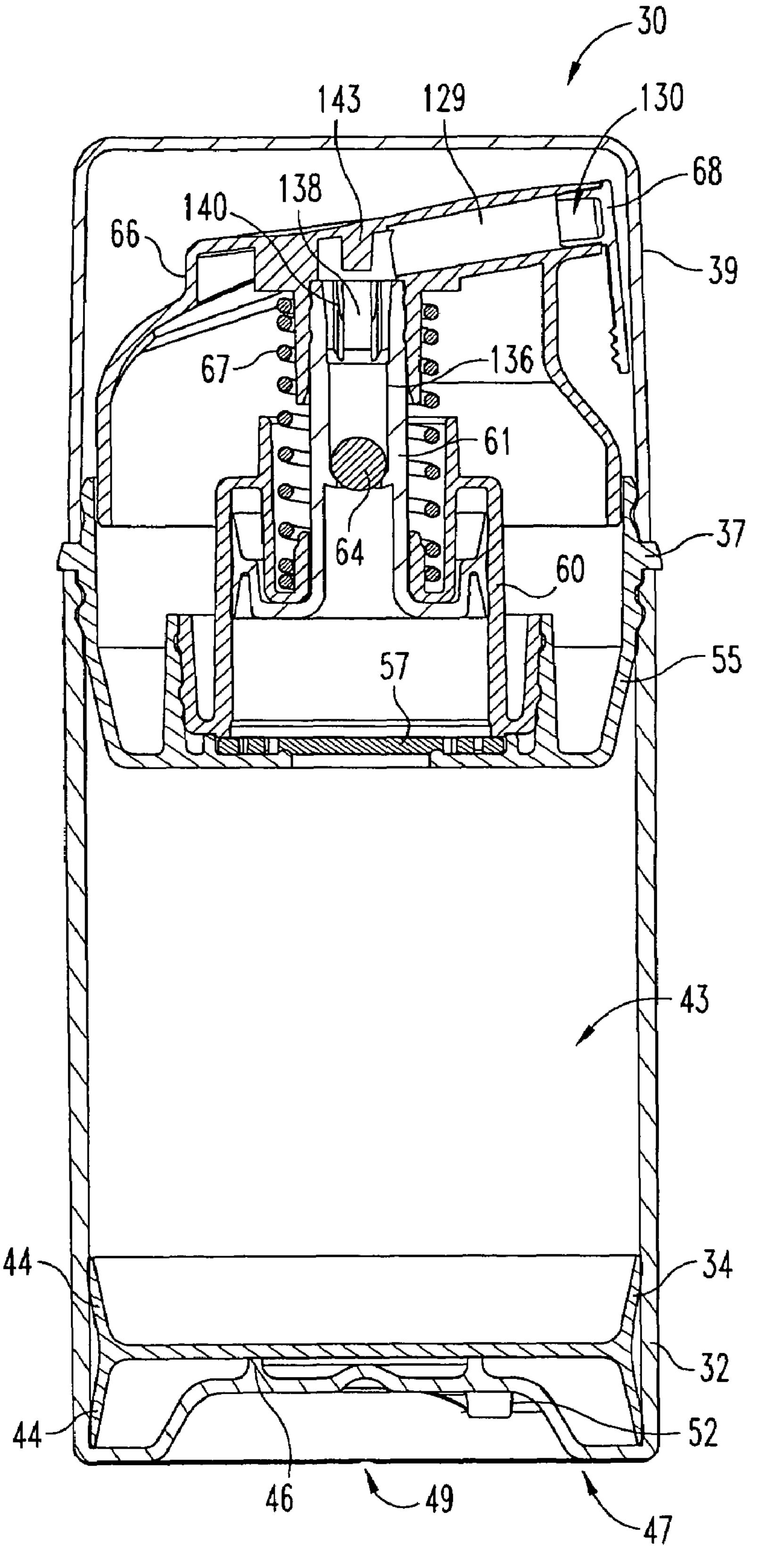
FIG. 1 is a cross-sectional view of a fluid dispensing assembly according one embodiment of the present invention.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail; although it will be apparent to those skilled in the relevant art that some features that are not relevant to the present invention may not be shown for the sake of clarity.

Figure 2:
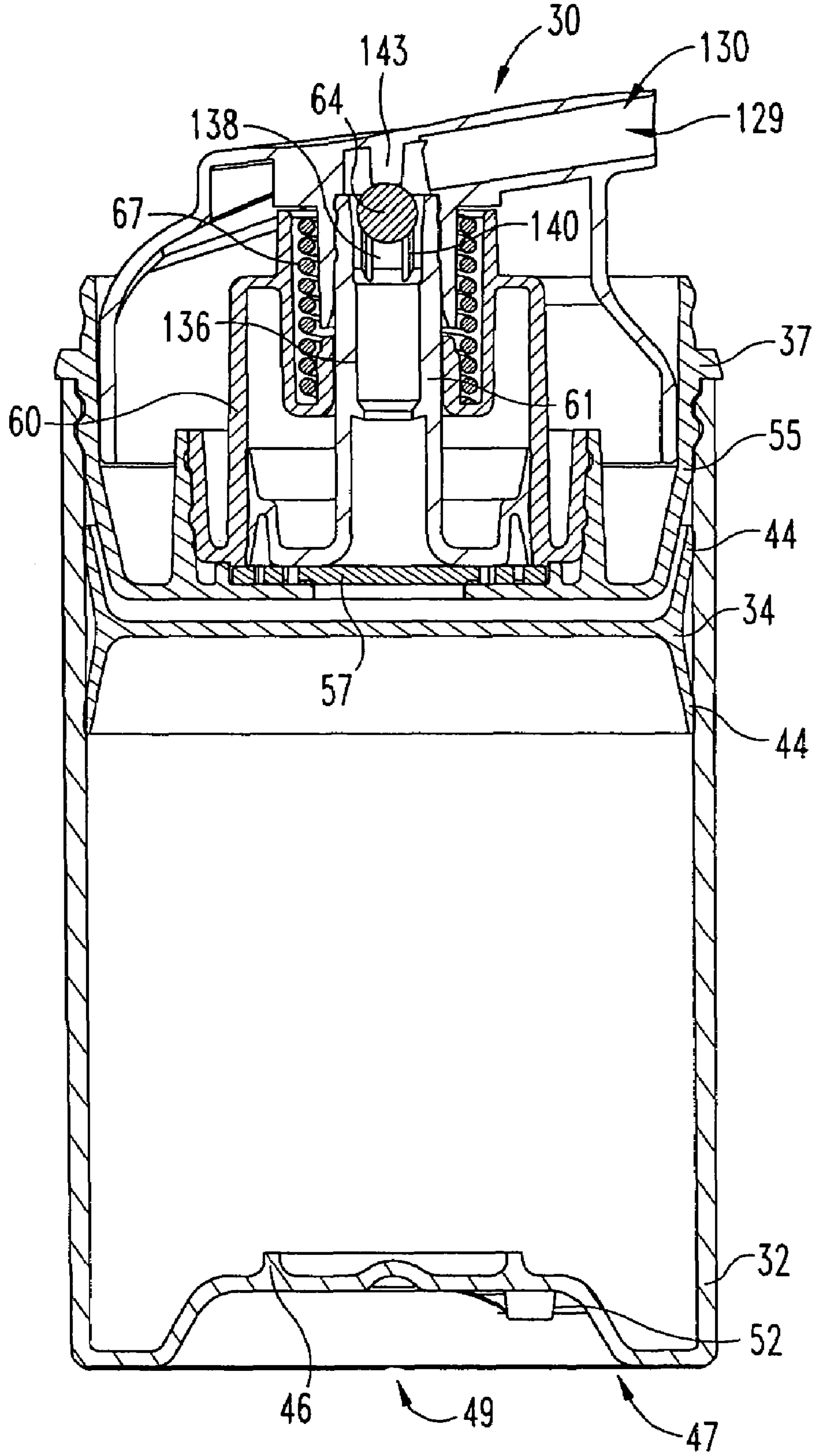
FIG. 2 is a cross-sectional view of the FIG. 1 assembly during a dispensing stroke.

An airless pump assembly 30 according one embodiment, among others, of the present invention is illustrated in FIGS. 1 and 2. As shown, the pump assembly 30 includes a container 32 for storing fluid, a follower piston 34 received in the container 32, a pump 37 for pumping fluid from the container 32, and a cap 39 that covers the pump 37. FIGS. 1 and 2 show two cross-sectional elevations, one of which, FIG. 1, shows the follower piston 34 at the bottom of the container 32 with the pump 37 at the top of its stroke, and the other, FIG. 2, shows the follower piston 34 at the point where virtually the entire contents of the container 32 have been dispensed with the pump 37 at the bottom of its stroke. It should be noted that directional terms, such as “up”, “down”, “top”, “bottom”, “left” and “right”, will be solely used for the convenience of the reader in order to aid in the reader’s understanding of the illustrated embodiments, and that the use of these directional terms in no way limits the illustrated features to a specific orientation. The pump assembly 30 will be described with reference to a follower piston type system, but it should be realized that selected features from the assembly 30 can be adapted for use with other types of pumping systems, such as with a collapsible bag type airless dispenser pump.

With reference to FIG. 1, the follower piston 34 is slidably received inside a cavity 43 in the container 32, and the follower piston 34 has upper and lower seal members 44 that seal against the container 32. An upstanding ring or support 46 at base 47 of the container 32 prevents the follower piston 34 being pushed too far into the base 47 of the container 32 during packing, thereby minimizing the risk of damage to the lower piston seal member 44. As fluid is dispensed from the container 32, a slight vacuum is formed, and consequently, the follower piston 34 slides up the cavity 43 to reduce the effective size of the cavity 43. At the base 47, the container 32 has one or more vent grooves 49 as well another opening (not show) that vent the container 32 in order to prevent a vacuum from forming between the underside of the follower piston 34 and the base 47 of the container 43 as the follower piston 34 moves progressively upwards during dispensing. The base 47 of the container 32 further has a drive dog 52, which allows the outside of the container 32 to be printed. In the illustrated embodiment, the container 32 as well as other components have a generally cylindrical shape, but it should be appreciated that these components can be shaped differently in other embodiments.

Figure 3:
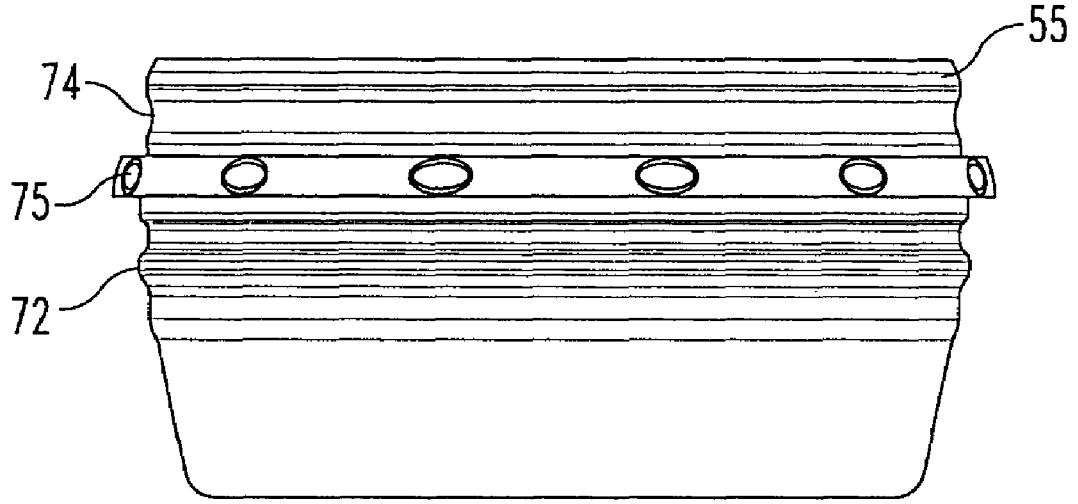
FIG. 3 is a front view of a pump body used in the FIG. 1 assembly.
Figure 4:
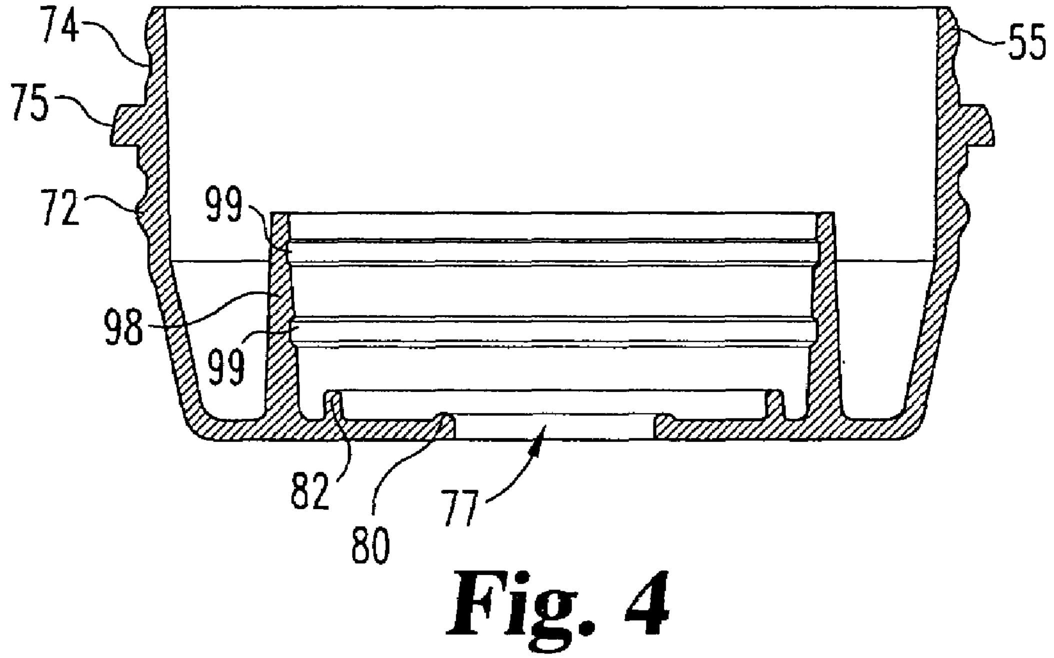
FIG. 4 is a front, cross-sectional view of the FIG. 3 pump body.

In the pump assembly 30, the pump 37 is secured to the container 32 through a snap fit type connection. Nevertheless, it should be appreciated that the pump 37 can be secured to the container 32 in other manners. As shown in FIGS. 1 and 2, the pump 37 includes a pump body 55 that is secured to the container 32, an inlet valve member 57 that controls the flow of fluid into the pump 37, a pump cylinder 60 in which a pump piston 61 is slidably disposed, an outlet valve member 64, a pump head 66 for dispensing the fluid, a return spring 67 and a nozzle plug 68. Looking at FIGS. 3 and 4, the pump body 55 has one or more ridges 72 that snap into corresponding grooves in the container 32. The pump body 55 further has a cap groove 74 to which the cap 39 is secured and a retention flange 75 positioned between the ridges 72 and the cap groove 74. At one end, the pump body 55 defines an inlet port 77 through which fluid is received from the container 32, as is illustrated in FIG. 4. Around the inlet port 77, the pump body 55 has a seal ridge or seat 80 that biases against and seals with the inlet valve member 57, and surrounding the seal ridge 80, the pump body 55 further has a valve retainer ridge 82 that aligns the inlet valve member 57 over the inlet port 77.

Figure 5:
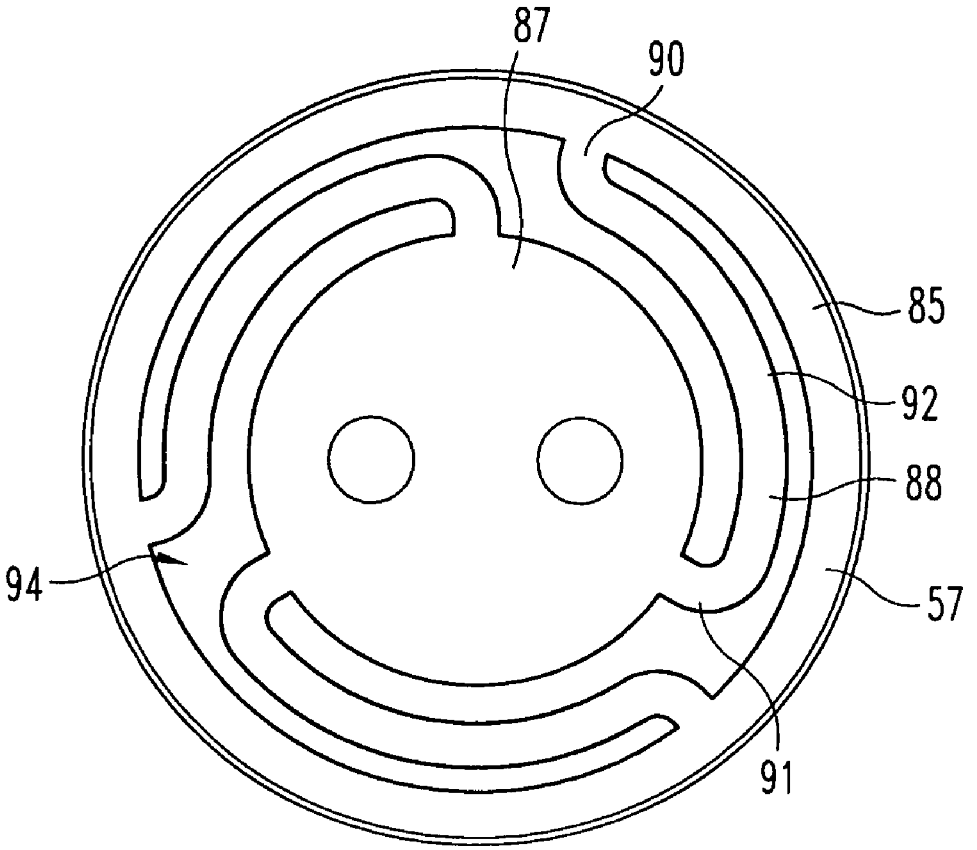
FIG. 5 is a top view of an inlet valve for the FIG. 1 assembly.
Figure 6:
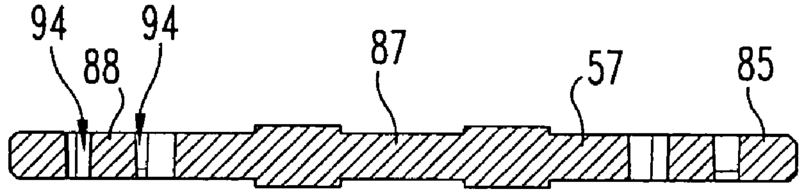
FIG. 6 is a side, cross-sectional view of the FIG. 5 inlet valve.

The inlet valve member 57 has a unique design that provides a number of advantages when dispensing viscous creams or other viscous fluids. As can be seen in FIGS. 5 and 6, the inlet valve member 57 has generally flat disk shape, but as should be understood, the inlet valve member 57 can have a different overall shape in other embodiments. The inlet valve member 57 includes an outer peripheral ring or support member 85 and an inner seal member 87 that is connected to the outer support member 85 through two or more connection legs 88. The outer support member 85 in the embodiment shown is in the form of a continuous ring, but it is envisioned that the outer support member 85 can have a different overall shape. For example, the outer support member 85 in other embodiments can include discontinuous segments. In the illustrated embodiment, the inlet valve member 57 has three legs, but in other embodiments, the valve 57 can have two or even more than three legs. Each leg 88 includes an outer portion 90 that generally extends radially inwards from the outer support member 85 and an inner portion 91 that extends radially outwards from the seal member 87. Between the outer 90 and inner 91 portions, each leg 88 has a circumferential portion 92 that extends between the support member and the seal member 87 in a circumferential direction such that the leg 88 generally extends around the periphery of the seal member 87. As shown, the legs 88 are surrounded on both sides by flow apertures 94. In the illustrated embodiment, the outer 90 and inner 91 portions of each leg 88 are radially offset about equidistantly from one another, which in this case is about one-hundred and twenty degrees (120°), so that the legs 88 are generally in the form of equal arc segments. In another embodiment where two legs 88 are used instead of three, the legs 88 almost form one-hundred and eighty degree (180°) arc segments, thereby allowing further lengthening the legs 88 for a given size of the inlet valve member 57. The length and shape of the legs 88 ensures that the inner seal member can lift from the seat 80 to enable the creation of a series of large openings through the apertures 94, which allow the easy flow of viscous fluid into the pump 37. By having the legs 88 extend in a circumferential or peripheral manner, the legs 88 can be longer than if they just extended in a radial direction, and with the legs 88 being longer, larger flow openings can be formed. Not only does the design of the inlet vale 57 allow large apertures to be created for the easy flow of viscous fluid; it just as importantly allows the inlet valve member 57 to close in an extremely quick manner. With two or more legs 88 pulling around the seal member 87, the seal member 87 is able to quickly seal against the seat 80. The speed with which the seal member 87 closes onto the valve seat 80 can also be adjusted either by changing the width, thickness and/or number of the legs 88, or by using a more or less rigid material. Consequently, the pumping action of the pump 37 can be modified to accommodate fluids with different characteristics by simply replacing the inlet valve member 57 with one having different properties. For example, it was discovered that using three equally sized legs 88 provided desirable flow opening sizes as well as favorable closing characteristics.

In one embodiment, the inlet valve member 57 is made of plastic in order to avoid product contamination with metal. As noted before, it is desirable that pharmaceutical products do not come into contact with metal in order to avoid contamination. In one particular form, it was found that the inlet valve member 57 works well when produced with a polyolefin material (polyethylene/polypropylene family), which can be relatively inexpensive. It is contemplated that the inlet valve member 57 can be made of other materials, however. For instance, the inlet valve member 57 can also be made in more sophisticated polymers in applications requiring operation in heat or where chemical compatibility is a factor. Except for the spring 67 and possibly the outlet valve member 64, all remaining components of the assembly 30 can be produced with polyolefin materials, which tend to reduce manufacturing costs. However, it should be understood that the components of the assembly 30 in other embodiments can be made of different materials, such as metal, if so desired.

Figure 7:
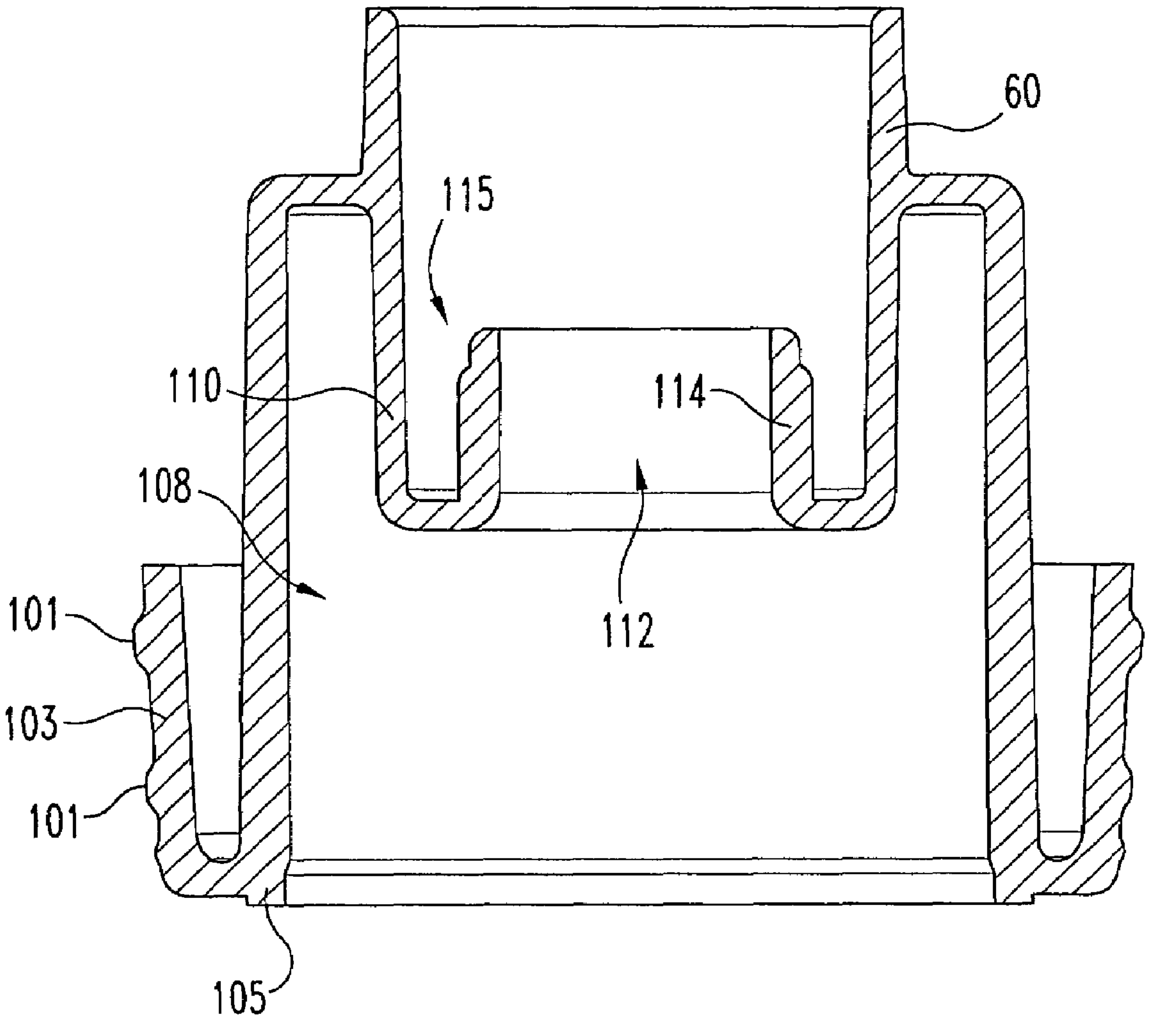
FIG. 7 is a cross-sectional view of a pump cylinder for the FIG. 1 assembly.

Looking again at FIGS. 1 and 2, when assembled into the pump 37, the inlet valve member 57 is sandwiched between the pump body 55 and the pump cylinder 60. The pump body 55 in FIG. 4 has a connector 98 that extends around inlet port 77 as well as the valve retainer ridge 82. Inside, the connector 98 has one or more snap grooves 99 that receive corresponding snap ridges 101 on a body engagement flange 103 that extends from the pump cylinder 60, which is illustrated in FIG. 7. At one end of the pump cylinder 60, facing the inlet valve member 57, a retention ridge 105 on the pump cylinder 60 clamps against the support member 85 on the inlet valve member 57. This ensures that the inlet valve member 57 cannot escape and is always held in correct relationship relative to the inlet port 77 in the pump body 55. In order to ensure rapid priming, the seal member 87 is biased to the closed position by the seat 80 around the inlet port 77 of the pump body 55 so that the inlet valve member 57 becomes virtually airtight during the initial priming of the pump 37. The amount of pre-load bias can be varied depending on the particular requirements. For example, the seat 80 in one embodiment extends about 0.3 mm high around the inlet port 77.

The pump cylinder 60 defines a pump cavity or chamber 108 in which the piston 61 is slidably received. Although the pump cylinder 60 and cavity 108 in FIG. 7 are generally cylindrical in shape, it is envisioned that they can have a different overall shape in other embodiments, such as a rectangular shape. A piston guide 110 with a guide opening 112 extends within the pump cavity 108 of the pump cylinder 60, and a guide flange 114 extends around the guide opening 112. Together, the piston guide 110 and the guide flange 114 define a spring retention groove 115 in which the spring 67 is received (FIG. 1).

Figure 9:
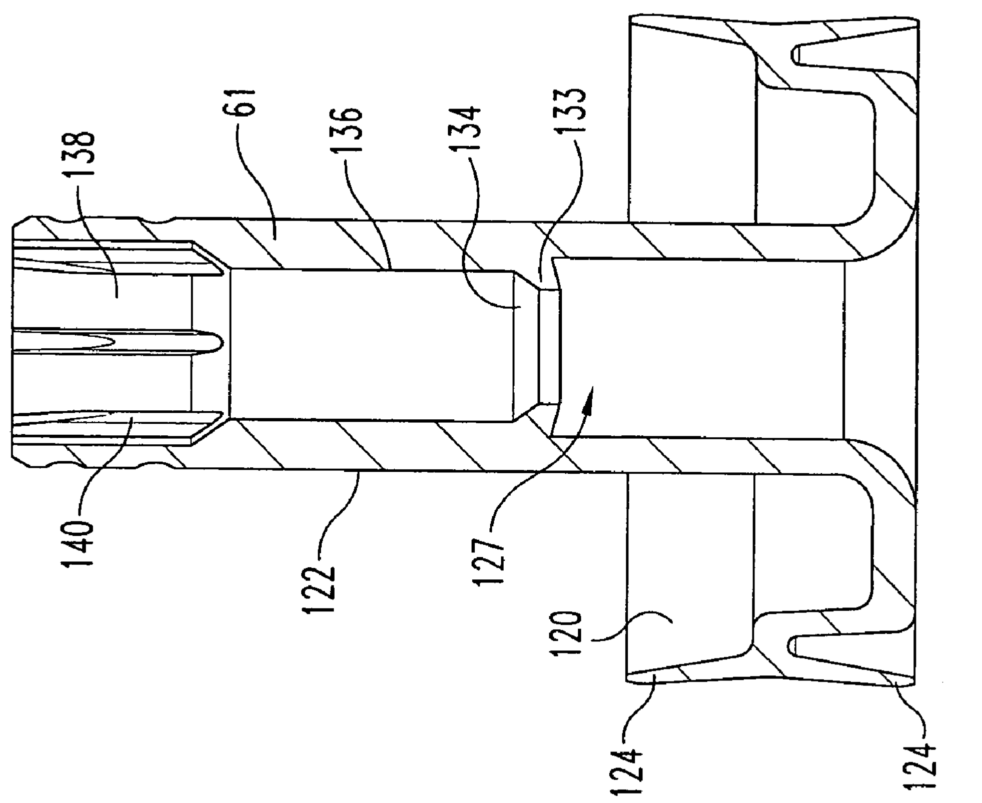
FIG. 9 is a front, cross-sectional view of the FIG. 8 piston.
Figure 8:
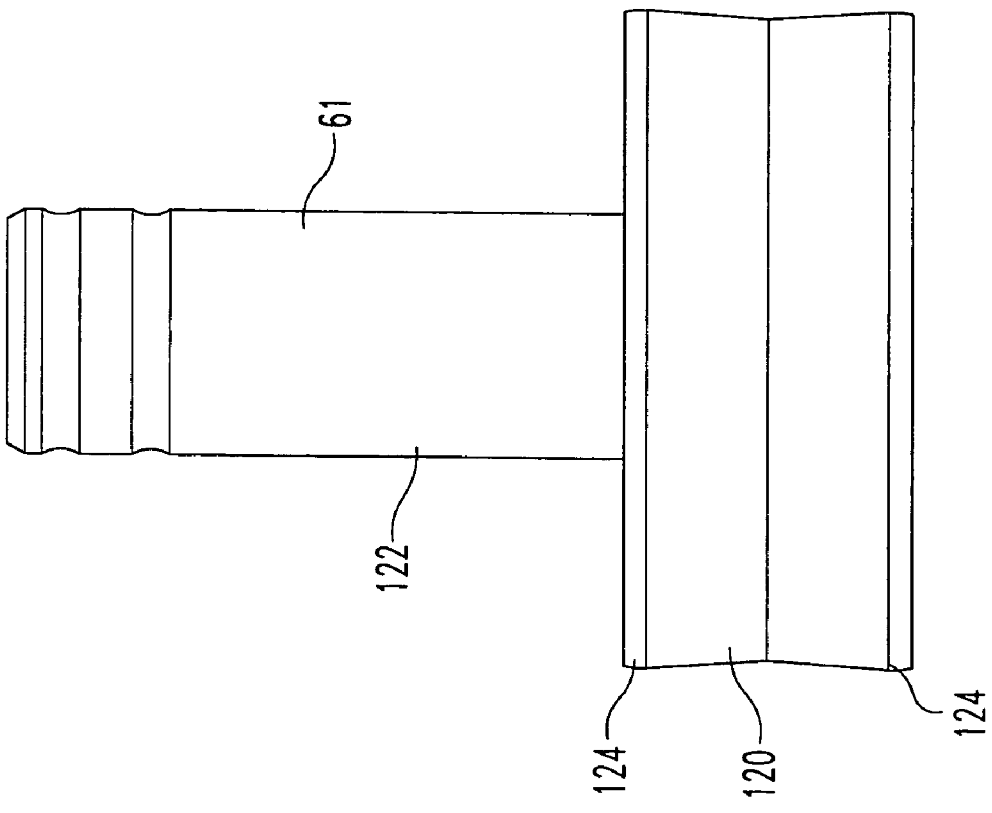
FIG. 8 is a front view of a piston in the FIG. 1 assembly.

As shown in FIGS. 8 and 9, the piston 61 has a piston head 120 that is attached to a shaft or stem 122. The piston head 120 has upper and lower seal members 124 that extend at a slight angle away from the piston head 120 in order to seal against the walls of the pump cavity 108. Both the piston head 120 and the shaft 122 of the piston 61 define a flow passage 127 through which the fluid is pumped. At the end of the shaft 122, opposite the piston head 120, the pump head 66 is snap fitted to the shaft 122, as is depicted in FIGS. 1 and 2. However, it should be recognized that the pump head 66 can be coupled to the shaft 122 in other manners. As illustrated, an outlet nozzle 129 with an outlet opening 130 in the pump head 66 is fluidly coupled to the flow passage 127 in the shaft 122 so that the fluid from the container 32 can be dispensed to the user. It should be noted that the spring 67 is mounted on the outside of the shaft 122, between the pump head 66 and the pump cylinder 60, and as a consequence, the spring 67 does not come into contact with the product being dispensed. As previously noted, this can be particularly important for pharmaceutical products where it is vital that the pharmaceutical product does not come into contact with metal.

The pump 37 in the illustrated embodiment is configured to minimize the amount of fluid that remains at the outlet opening 130 of the pump head 66, where the fluid may dry or harden due to contact with air. To remedy this problem, the pump 37 incorporates a suck-back feature in which fluid in the outlet opening 130 is sucked back into the pump 37. With reference to FIGS. 1 and 9, the piston 61 has in the flow passage 127 a valve seat or flange 133 with a conical surface 134, against which the outlet valve member 64 seals. The outlet valve member 64 acts like a check valve to permit flow of the fluid in only one direction. In the illustrated embodiment, the outlet valve member 64 has a generally spherical or ball shape, but it should be understood that the outlet valve member 64 can be shaped differently in other embodiments. For instance, the outlet valve member 64 in other embodiments can have a cylindrical shape. In order to minimize metal contact within the pump 37, the outlet valve member 64 in one embodiment is manufactured in a non-metallic material. For example, the outlet valve member 64 in one embodiment is made of glass; however, a wide range of plastic materials can also be used in other embodiments. In systems where metal contact is not a concern, it is contemplated that the outlet valve member 64 can be made of metal.

Downstream from the valve seat 133, the flow passage 127 has a first portion 136 that is just slightly larger than the diameter (size) of the outlet valve member 64 so as to allow movement of the outlet valve member 64, while still preventing the passage of fluid around the outlet valve member 64. This tight fit between the outlet valve member 64 and the first portion 136 of the flow passage 127 creates a piston like fit that is used to draw fluid back from the outlet nozzle 129 during the upstroke of the piston 61. Near the pump head 66, the flow passage 127 has a second portion 138 that is larger than the first portion 136 such that the second portion 138 is sized large enough to permit fluid to flow around the outlet valve member 64 during the down stroke of the piston 61. In the second portion 138, the piston 61 has ribs 140 that center the outlet valve member 64 over the first portion 136 so that the outlet valve member 64 is able to drop back into the first portion, as is shown in FIG. 2. The ribs 140 extend radially inwards and along the axis of the flow passage 127. Without the ribs 140 or some other centering structure, the outlet valve member 64 could move to one side which could cause its return to the seat 133 to be delayed, and in the worst case scenario, could cause air to be sucked back into the pump cavity 108. At one end of the flow passage 127, the pump head 66 has a stop member 143 that limits the travel of the outlet valve member 64 to between the valve seat 133 and the stop member 143. In other embodiments, it is contemplated that the pump 37 can further incorporate a spring or other type of biasing device to bias the outlet valve member 64 against the valve seat 133. By incorporating this suck back feature into the piston 61, assembly of the piston mechanism is simplified.

The pump 37 in the illustrated embodiment is a manually operated by pressing on the pump head 66, but it should be appreciated that the pump 37 in other embodiments can be automatically actuated. Before use, both the cap 39 and plug 68 are removed from the pump 37. After the pump head 66 is pushed down, the spring 67 causes the piston 61 as well as the pump head 66 to return to an extended position. On this upstroke or intake stroke of the piston 61, the outlet valve member 64 travels from the second portion 138 of the flow channel 127 (FIG. 2) to the first portion 136 (FIG. 1). Once the outlet valve member 64 reaches the first portion 136, the outlet valve member 64 tightly slides within the first portion 136 and acts like a virtual piston, which draws back the fluid from the outlet nozzle 129 well inboard to a position in the flow passage 127 above the outlet valve member 64. By drawing the fluid from the nozzle 129, the chance of fluid encrusting at the outlet opening 130 is reduced. During the upstroke, the outlet valve member 64 eventually sits in the valve seat 133 to create a vacuum in the pump cavity 108, as is shown in FIG. 1. The vacuum formed in the pump cavity 108 causes the inlet valve member 57 to open, thereby providing a wide through path for the fluid from the container 32 to enter into the pump cavity 108. On the down or dispensing stroke of the pump 37, the inlet valve member 57 shuts to prevent the fluid in the pump cavity 108 from being pushed back into the container 32. The outlet valve 64 lifts off the valve seat 133 to allow fluid to be dispensed via the head nozzle 129. Specifically, as the outlet valve member 64 travels in the first portion 136, the fluid is unable to pass around the outlet valve member 64, but once the outlet valve member 64 reaches the larger second portion 138 of the flow passage 127, the fluid is able to pass around the outlet valve 57 and out the nozzle 129. Additional fluid can be dispensed by pressing and releasing the pump head 66 in the manner as described above.

Figure 10:
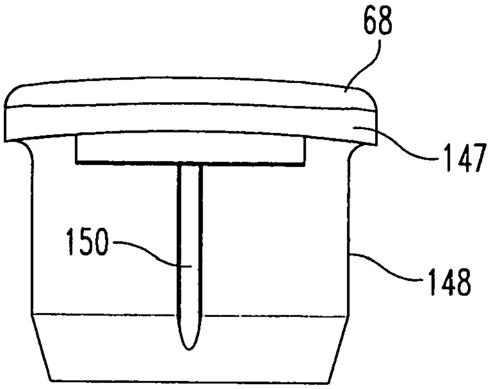
FIG. 10 is a bottom view of a plug in the FIG. 1 assembly.
Figure 11:
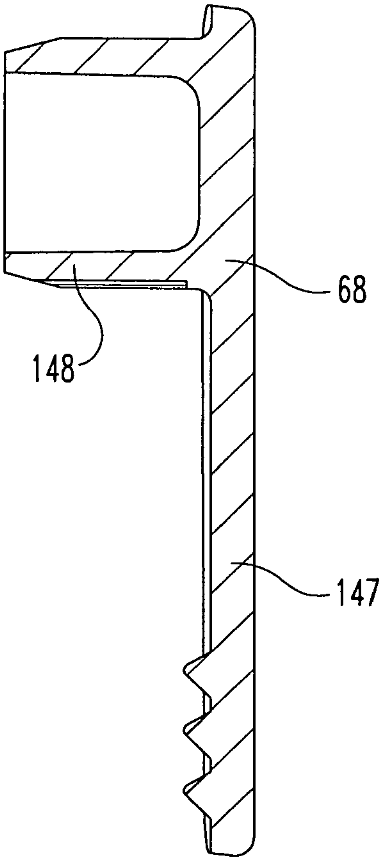
FIG. 11 is a side, cross-sectional view of the FIG. 10 plug.

To make sure that the outlet 130 of the nozzle 129 remains clean during initial shipment, the nozzle plug 68 is plugged into the nozzle 129 to ensure that there is no leakage of the fluid. Looking at FIGS. 10 and 11, the plug 68 includes a handle or tab 147 that is used to pull the plug 68 from the nozzle 129 and a plug portion 148 that is plugged into the outlet opening 130 of the nozzle 129. The plug portion 148 incorporates a fine vent channel 150 that is sized small enough to prevent leakage of medium to high viscosity fluids, but allows air to escape during initial priming of the pump 37. To also aid in minimizing leakage during shipping, the pump 37 is covered by the cap 39. The cap 39 ensures that the pump head 66 cannot be inadvertently depressed during transit as well as keeps the dispensing pump 37 in prime condition and clean for display purposes. The cap 39 also enables the total package to withstand high top loads, which can result when quantities of packs are stacked on top of each other.

Figure 12:
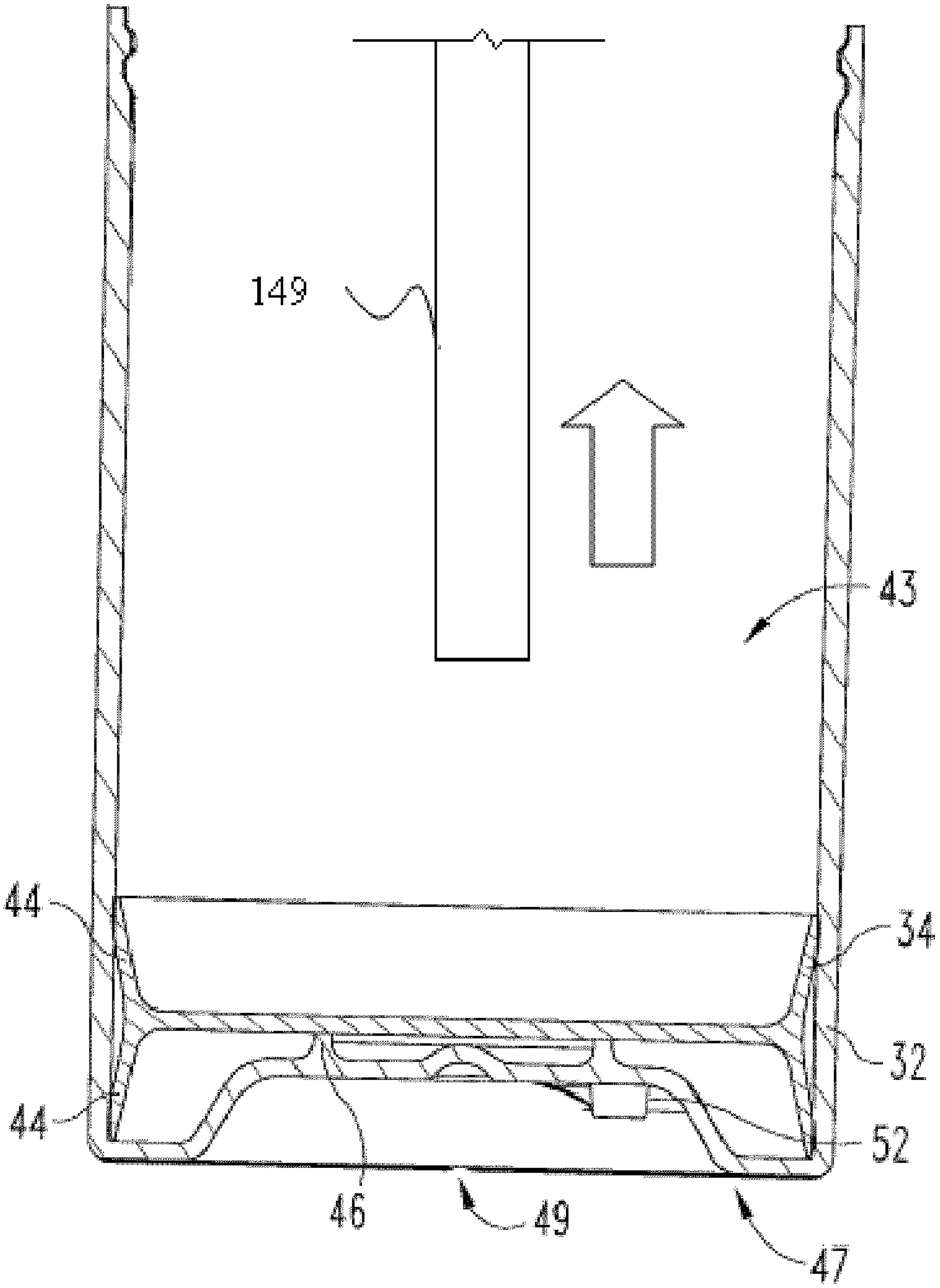
FIG. 12 is a cross-sectional view of the FIG. 1 assembly during filling.

Before filling the container 32, the follower piston 34 is pre-assembled into the container 32 and pushed to the bottom position, as is shown in FIG. 1. As mentioned before, the support 46 in the container 32 prevents the follower piston 34 being pushed too far into the base 47 of the container 32. The design of the pump assembly 30 lends itself to "top-filling" in that the container 32 is normally passed down a filling line and filled from the top with the fluid or product being initially dispensed on top of the follower piston 34. In one form, a diving nozzle 149, which is used to fill the container 32, initially dives inside the cavity 43 to the bottom of the container 32 immediately above the follower piston 34 and progressively retracts as the fluid is dispensed, as is depicted in FIG. 12. This technique ensures the minimum entrapment of air, which can be detrimental to the performance of the assembly 30. Once the appropriate filling level has been achieved, the dispensing pump 37, along with the plug 68 and cap 39, is snap-fitted to the top of the container 32. In the process of snapping the dispensing pump 37 to the container 32, the fluid in the container 32 forces the inlet valve member 57 to open and partially primes the pump cavity 108. The very fine vent channel 150 in the plug 68 ensures that the entrapped air, which becomes pressurized as the pump 37 is snapped into place, is allowed to escape so as to ensure that there is no resistance to the opening of the inlet valve member 57 for priming purposes. Venting air through the vent channel 150 further reduces the danger of product spillage at the snap-fit between the container 32 and the pump body 55. By pre-priming the pump 37 in such a manner ensures that even with the most viscous fluid, a minimal number of priming strokes are required in order for the pump 37 to commence operation.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

What is claimed is:

1. An airless dispenser pump assembly, comprising:

a pump mechanism defining a pump cavity with an inlet port through which viscous fluid from a container is supplied, the pump mechanism sealing with the container and being configured to minimize air infiltration into the container, the pump mechanism including a piston slidably received in the pump cavity to pump the fluid from the pump cavity, an outlet valve member configured to permit flow of the viscous fluid out of the pump cavity during a dispensing stroke of the piston and to firm a vacuum in the pump cavity during an intake stroke of the piston, and an inlet valve member covering the inlet port, wherein the inlet valve member includes an outer support member, an inner seal member that is sized to seal the inlet port during the dispensing stroke of the piston, and two or more connection legs connecting the outer support member to the inner seal member for rapidly closing the inlet port during the dispensing stroke of the piston, wherein at least one of the connection legs includes a circumferential portion that extends in a circumferential direction around the seal member to provide a large flow aperture for the viscous fluid between the legs during the intake stroke of the piston.

2. The assembly of claim 1, further comprising:

wherein the piston includes a shaft that defines a flow passage; and a metallic spring wrapped around the shaft, outside the flow passage, to minimize metallic contamination of the viscous fluid.

3. The assembly of claim 2, wherein the piston, outlet valve member and inlet valve member are made of non-metallic material.

4. The assembly of claim 1, wherein the piston defines a flow passage with a valve seat against which the outlet valve member seals during the intake stroke.

5. The assembly of claim 4, wherein:

the pump mechanism includes an outlet opening fluidly coupled to the flow passage for dispensing fluid from the flow passage;

the flow passage has a first portion located proximal the valve seat and a second portion located distal to the valve seat;

the first portion is sized slightly larger than the outlet valve member to allow the outlet valve member to slide within first portion while creating a piston like fit between the first portion and the outlet valve member for drawing the viscous fluid back from the outlet opening during the intake stroke of the piston; and the second portion is sized larger than the first portion to allow the viscous fluid to flow around the outlet valve member and out the outlet opening during the dispensing stroke of the piston.

6. The assembly of claim 5, wherein the second portion includes a guide structure that guides the outlet valve member back into the first portion for reducing air infiltration into the pump cavity.

7. The assembly of claim 6, wherein the guide structure includes one or more ribs.

8. The assembly of claim 5, wherein the pump mechanism includes a stop member extending proximal the second portion to limit movement of the outlet valve member.

9. The assembly of claim 1, wherein the outlet valve member is spherical.

10. The assembly of claim 1, wherein the inlet valve is disk shaped.

11. The assembly of claim 1, wherein the support member is ring shaped.

12. The assembly of claim 1, wherein:

the inlet valve includes three of the connection legs;

the three connection legs each include the circumferential portion; and the three connection legs are equidistantly spaced apart around the inner seal member.

13. The assembly of claim 1, wherein the pump mechanism includes a seal ridge disposed around the inlet port to preload the inlet valve member.

14. The assembly of claim 1, wherein the pump mechanism includes:

a pump body configured to couple to the container, the pump body defining the inlet port:

a pump cylinder defining the pump cavity; and wherein the pump cavity and the pump cylinder are coupled together with the inlet valve member sandwiched in between to retain the inlet valve member over the inlet port.

15. The assembly of claim 1, further comprising the container.

16. The assembly of claim 15, further comprising:

a follower piston slidably disposed in the container with at least one seal member that seals against the container; and wherein the container has a base with a support member that supports the follower piston during filing of the container to minimize damage of the seal member.

17. The assembly of claim 1, further comprising:

wherein the pump mechanism includes an outlet opening from which the viscous fluid is dispensed; and a plug received in the outlet opening to reduce leakage of the viscous fluid during shipping, wherein the plug includes a vent channel sized to vent air from the pump mechanism as the pump mechanism is attached to the container to allow pre-priming of the pump mechanism.

18. A dispenser pump assembly, comprising:

a pump mechanism defining a pump cavity, the pump mechanism including an inlet valve member for controlling flow of fluid into the pump cavity, a piston slidably received in the pump cavity to pump the fluid from the pump cavity, the piston defining a flow passage through which the fluid from the pump cavity is pumped, a pump head having a dispensing outlet fluidly coupled to the flow passage for dispensing the fluid, an outlet valve member received in the flow passage of the piston for controlling flow of the fluid out of the pump cavity, and wherein the flow passage includes a first portion sized to create a piston like fit between the first portion and the outlet valve member for drawing the fluid back from the dispensing outlet after the fluid is dispensed, a second portion sized larger than the first portion to allow the fluid to flow around the outlet valve member during dispensing of the fluid, and wherein the piston includes a guide structure extending within the second portion of the flow passage to align the valve member with the first portion.

19. The assembly of claim 18, wherein the guide structure includes one or more ribs extending radially inwards from the piston along the flow passage.

20. The assembly of claim 18, wherein the pump head includes a stop member extending proximal the second portion to limit movement of the outlet valve member.

21. The assembly of claim 18, wherein the outlet valve member has a spherical shape.

22. The assembly of claim 18, wherein the inlet valve member includes:

an outer support member;

an inner seal member; and at least three connection legs connecting the outer support member to the inner seal member.

23. An airless dispenser pump assembly, comprising:

a container defining a container cavity in which a viscous fluid is contained;

an airless dispensing pump mechanism secured to the container to pump the viscous fluid from the container cavity;

the pump mechanism sealing the container cavity to minimize air infiltration into the container cavity;

the container including means for reducing an effective size of the container cavity as the pump mechanism pumps the viscous fluid from the container cavity; and the pump mechanism including an inlet port through which the viscous fluid from the container cavity is supplied to the pump mechanism, a piston slidably disposed in the pump mechanism to move between a dispensing stroke in which the viscous fluid is dispensed from the pump mechanism and an intake stroke in which the viscous fluid is drawn into the pump mechanism, and an inlet valve member covering the inlet port, the inlet valve member including an outer support member, an inner seal member that is sized to seal the inlet port during the dispensing stroke of the piston, and two or more connection legs connecting the outer support member to the inner seal member for rapidly closing the inlet port during the dispensing stroke of the piston, at least one of the connection legs including a circumferential portion that extends in a circumferential direction around the seal member to provide a large flow aperture for the viscous fluid between the legs during the intake stroke of the piston.

24. The airless dispenser pump assembly of claim 23, in which the means for reducing the effective size of the container cavity includes a follower piston slidably disposed in the container.

25. The airless dispenser pump assembly of claim 24, further comprising:

the valve member having a generally flat disk shape; and the pump mechanism including a pump body that is flat facing the follower piston to coincide in shape with the follower piston for facilitating emptying of the viscous fluid from the container cavity.

26. The airless dispenser pump assembly of claim 24, further comprising:

the container having a closed end and an open end, the follower piston being disposed between the closed end and the open end of the container; and the pump mechanism being attached to the open end of the container.

27. The airless dispenser pump assembly of claim 23, further comprising:

the piston defining a flow passage through which the viscous fluid flows; and a return spring configured to bias the piston; the return spring disposed along the outside of the piston and outside of the flow passage to eliminate contact between the viscous fluid and the return spring.

28. The airless dispenser pump assembly of claim 23, further comprising:

the pump mechanism including a dispensing outlet to dispense the viscous fluid from the pump, a flow passage through which the viscous fluid flows to the dispensing outlet, an outlet valve disposed in the flow passage, and the flow passage including a first portion sized to create a piston like fit between the first portion and the outlet valve member for drawing the fluid back from the dispensing outlet after the dispensing stroke, and a second portion disposed between the first portion and the dispensing outlet, the second portion being sized larger than the first portion to allow the fluid to flow around the outlet valve member during dispensing of the fluid.

29. The airless dispenser pump assembly of claim 28, in which the second portion has one or more guide ribs for aligning the outlet valve with the first portion of the flow passage.

30. The airless dispenser pump assembly of claim 23, further comprising:

a plug received in the outlet opening to reduce leakage of the viscous fluid during shipping, wherein the plug includes a vent channel sized to vent air from the pump mechanism as the pump mechanism is attached to the container to allow pre-priming of the pump mechanism.

31. A dispenser pump assembly, comprising:

a pump mechanism defining a pump cavity, the pump mechanism including an inlet valve member for controlling flow of fluid into the pump cavity, wherein the inlet valve member includes an outer support member, an inner seal member, and at least three connection legs connecting the outer support member to the inner seal member, a piston slidably received in the pump cavity to pump the fluid from the pump cavity, the piston defining a flow passage through which the fluid from the pump cavity is pumped, a pump head having a dispensing outlet fluidly coupled to the flow passage for dispensing the fluid, an outlet valve member received in the flow passage of the piston for controlling flow of the fluid out of the pump cavity, and wherein the flow passage includes a first portion sized to create a piston like fit between the first portion and the outlet valve member for drawing the fluid back from the dispensing outlet after the fluid is dispensed, and a second portion sized larger than the first portion to allow the fluid to flow around the outlet valve member during dispensing of the fluid.

* * * * *

UNITED STATES PATENT AND TRADEMARK OFFICE

CERTIFICATE OF CORRECTION

PATENT NO. : 7,654,418 B2
APPLICATION NO. : 10/930010
DATED : February 2, 2010
INVENTOR(S) : Brian Robert Law It is certified that error appears in the above-identified patent and that said Letters Patent is hereby corrected as shown below:

Col. 8, line 53, replace --firm-- with "form"

Signed and Sealed this

Sixteenth Day of March, 2010

David J. Kappos

*Director of the United States Patent and Trademark Office*

UNITED STATES PATENT AND TRADEMARK OFFICE

CERTIFICATE OF CORRECTION

PATENT NO. : 7,654,418 B2
APPLICATION NO. : 10/930010
DATED : February 2, 2010
INVENTOR(S) : Law et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1125 days.

Signed and Sealed this

Twenty-eighth Day of December, 2010

David J. Kappos

*Director of the United States Patent and Trademark Office*